US008150610B2

(12) United States Patent
Filizola et al.

(10) Patent No.: US 8,150,610 B2
(45) Date of Patent: Apr. 3, 2012

(54) SYSTEM AND RELATED METHOD FOR ROAD TRAFFIC MONITORING

(75) Inventors: Davide Filizola, Turin (IT); Dario Parata, Turin (IT); Piero Lovisolo, Turin (IT); Alessandro Capuzzello, Turin (IT)

(73) Assignee: Telecom Italia S.p.A., Milan (IT)

( * ) Notice: Subject to any disclaimer, the term of this patent is extended or adjusted under 35 U.S.C. 154(b) by 817 days.

(21) Appl. No.: 12/087,264

(22) PCT Filed: Dec. 30, 2005

(86) PCT No.: PCT/IB2005/003911

§ 371 (c)(1),
(2), (4) Date: Nov. 7, 2008

(87) PCT Pub. No.: WO2007/077472

PCT Pub. Date: Jul. 12, 2007

(65) Prior Publication Data

US 2009/0170533 A1 Jul. 2, 2009

(51) Int. Cl.
*G06F 7/70* (2006.01)

(52) U.S. Cl. .......................... 701/118; 701/117; 340/901

(58) Field of Classification Search .................. 701/117, 701/118, 119; 340/901, 905, 906, 907
See application file for complete search history.

(56) References Cited

U.S. PATENT DOCUMENTS 6,341,255 B1 * 1/2002 Lapidot .......................... 701/209
6,490,519 B1 12/2002 Lapidot et al.
6,577,946 B2 6/2003 Myr
6,650,948 B1 11/2003 Atkinson et al.
2003/0014181 A1 1/2003 Myr

FOREIGN PATENT DOCUMENTS

EP 1 209 647 A1 5/2002
EP 1 489 576 A1 12/2004

OTHER PUBLICATIONS

3GPP TS 25.305, "3rd Generation Partnership Project; Technical Specification Group Radio Access Network; Stage 2 functional specification of User Equipment (UE) positioning in UTRAN (Release 6)", V6.1.0, pp. 1-54, (Jun. 2004).
3GPP TS 43.059, "3rd Generation Partnership Project; Technical Specification Group GSM/EDGE Radio Access Network; Functional stage 2 description of Location Services (LCS) in GERAN (Release 6)", V6.3.0, pp. 1-65, (Apr. 2004).
Brown, et al., "Introduction to Random Signals and Applied Kalman Filtering", 3rd d., John Wiley & Sons, Inc., pp. 1-4, (1997).

* cited by examiner

*Primary Examiner* — Gertrude Arthur Jeanglaude
(74) *Attorney, Agent, or Firm* — Finnegan, Henderson, Farabow, Garrett & Dunner, L.L.P.

(57) ABSTRACT

A road traffic monitoring system includes: a first input for receiving position estimations of mobile terminals; a second input for receiving input specifications chosen depending on the type of service for which such monitoring is performed; and an output for generating road traffic maps, each road traffic map being associated with a set of territory elements and including, for each one of the territory elements, at least one mobility index of mobile terminals travelling within such territory element. Preferably, input specifications are chosen among at least two of the following parameters, territory element, territory element observation time slot, and maximum allowable error on the estimation of at least one mobility index.

11 Claims, 5 Drawing Sheets

SYSTEM AND RELATED METHOD FOR ROAD TRAFFIC MONITORING

CROSS REFERENCE TO RELATED APPLICATION

This application is a national phase application based on PCT/IB2005/003911, filed Dec. 30, 2005.

FIELD OF THE INVENTION

The present invention refers to a system and its related method for road traffic monitoring.

BACKGROUND ART DESCRIPTION

The majority of systems for road traffic monitoring currently used employ, for traffic monitoring, information coming from sensors and video-cameras placed along the roads, from drivers through telephone signalling to radio broadcasting stations which deal with providing information about traffic and/or from road police.

For road traffic monitoring, systems are also used which use position information coming from vehicles equipped with receivers which are able to determine the vehicle position, such as, for example, Global Position System (GPS) receivers.

Moreover, in recent years, road traffic monitoring systems are also used which are able to use position data coming from communication systems of the cellular type. These systems have the advantage of not requiring additional infrastructures, such as sensors, video-cameras or GPS receivers assembled on vehicles. They anyway allow having capillary traffic estimations, namely it is possible to have traffic estimations wherever there is a cellular coverage.

For example, U.S. Pat. No. 6,577,946 discloses an intelligent data gathering and processing system coming from existing cellular telephone networks. The system utilizes real time cell phone position data for reconstructing concurrent traffic conditions.

The system builds and maintains in time a list of vehicles moving along all road sections at particular points, by tracking all in-vehicle cell phones within a given region.

At each moment, the system maintains a series of such lists. This allows the system to obtain accurate estimations of the total number of vehicles travelling on each specific road section, together with their direction of travel and average velocity. Based on these data, the system is able to 1) compute real-time traffic loads for various roads and road sections; 2) generate detailed lists of vehicle turns, real-time turning data for all relevant intersection; and 3) other traffic parameters. The system uses heuristic algorithms to distinguish between position data coming from cell phones placed on vehicles or from cell phones of other users.

U.S. Pat. No. 6,650,948 discloses a method for monitoring vehicular traffic flow in a road network of an area served by a mobile telecommunication device network having a call management system provided with a mobile telecommunications device positioning system providing positional data for active mobile telecommunications devices. The method comprises: capturing geographic positioning data for individual devices carried aboard vehicles and converting these into probability vectors representing the likelihood of the vehicles having arrived at any of the possible road components of the road network compatible with the captured geographic positional data. As the vehicle travels along, this process is repeated and new probability vectors constructed based on the probability of any of the available routes between the road component position associated with the new probability vector and the road component position associated with the immediately previous probability vector. The expected transit times $\Delta t_x$ for the available routes are computed and compared with actual transit times to provide delay factors for the available routes.

U.S. Pat. No. 6,490,519 discloses a traffic monitoring system including a traffic data collecting apparatus adapted to collect location information from a plurality of mobile communication device users and a traffic data filter adapted to analyse location information coming from the plurality of users and removing location information which do not deal with vehicle traffic.

OBJECT AND SUMMARY OF THE INVENTION

The Applicant has noted that, so far, prior art solutions for road traffic monitoring are not wholly satisfactory.

For example, road traffic monitoring systems which use positioning methods based on GPS (or Assisted GPS-AGPS, where GPS receivers are integrated in cellular phones and cooperate therewith and with mobile network in order to define their location) receivers, though being extremely reliable in terms of positioning accuracy, can have several problems. A first problem is for example linked to the low percentage of users, who have a mobile terminal available which is equipped with a GPS receiver. Moreover, even having available a high number of mobile terminals equipped with GPS receivers, a road traffic estimation which uses positioning data provided by these receivers would require that these latter ones are continuously active. This implies a high consumption of batteries placed on mobile terminals, in addition to requiring a continuous update to terminals themselves, towards the cellular communication network, about their position, with following overload of signalling and connections on the network itself.

A further problem can deal with the incomplete availability of a GPS positioning function in a hurban context. In fact, in hurban areas with many buildings, it can happen that a GPS receiver does not manage to connect itself with an enough number of satellites for obtaining an accurate position estimation and therefore, in these areas, the positioning function can result unavailable.

As regards road traffic monitoring systems which use mobile terminal position data which come from cellular communication systems (such as, for example, methods like CI (Cell Identity), Enhanced CI, TDOA (Enhanced Observed Time Difference), EOTD (Observed Time Difference Of Arrival), described for example in 3GPP TS 25.305 and TS 43.059 specifications), it happens that these methods can provide errors in estimating the terminal position which can be on the order of 100 m/200 m in high cell density areas (typically hurban areas) but can also reach values of several Km in low cell density areas (typically sub-hurban or extrahurban areas).

The Applicant therefore has dealt with the technical problem of realising a road traffic monitoring system which is able to provide an accurate and well detailed road traffic estimation, further adapted to the specific service for which such estimation is required.

Specifically, the present invention deals with a system, and its related method, for road traffic monitoring which, depending on mobile terminal position estimations and suitable input specifications, is able to build detailed pixel-based road traffic maps.

It should be stated that, during the present description, the term pixel means a territory element, whose shape is typically rectangular, or, more particularly, squared, having variable sizes. In particular, each road traffic map is associated with a set of pixels covering a relevant geographic area, and contains, for each pixel belonging to the set, mobility index values (for example, average speed) of mobile terminals/vehicles which travel within such specific pixel for a certain time slot in which the pixel itself is observed.

The road traffic monitoring system, which is the subject matter of the present invention, can use position estimations on mobile terminals based on information coming from a cellular communication system (for example of the GSM, EDGE, UMTS, PDC "Personal Digital Cellular" type).

The monitoring system of the present invention can also use position estimations based on information coming from other systems (such as for example the GPS, AGPS, Galileo or Assisted-Galileo system) provided that the position estimations which are obtained from these systems take into account that a subset of terminals is under mobility.

The Applicant has however noted that the lack of exactness of mobile terminal position estimations which are obtained by using information coming from the above cited systems determines a condition for which, after having set a pixel size and a time slot width for observing them, the mobility index values computed by the monitoring system are affected by errors. Errors in mobility indexes decrease when the number of terminals under mobility being observed increase, in a certain pixel and for a certain observation time slot.

The Applicant has also observed that the number of observed terminals under mobility depends on the pixel size (the greater the pixel size, the higher the number of terminals travelling in such pixel) and on the observation time slot size (the greater the observation time slot size, the higher the number of observed terminals). This implies that, after having set the number of observed terminals, which makes the mobility indexes estimation reliable, there is a trade-off between pixel size and observation time slot size for the pixel itself.

The present invention is able to take into account such trade-off, making the mobility index estimations more accurate, using as input specifications to the monitoring system at least two parameters chosen among: pixel size, observation time slot length and maximum allowable error on mobility indexes estimation. After having set at least two among the above listed parameters, for example observation time slot and maximum allowable error on mobility indexes estimation, the monitoring system according to the invention is able to determine the other parameter, in this case the pixel size, depending on pre-computed relationships, namely of mathematical models which allow describing the link existing between input specifications and parameter to be computed, also taking into account other parameters, the so-called characteristic data, which can include: density of user calls within each pixel and used positioning method error.

The presence of such input specifications allows better adapting the monitoring system to the service for which such monitoring is required. In particular, there are some services, for example those which provide for traffic display on road maps with a set resolution, which require as input specifications to set pixel size and maximum allowable error on mobility indexes estimation. For other services, for example those requiring real-time information about road traffic, as input specifications, it is preferable to set the observation time slot length in addition to the maximum allowable error on mobility indexes. In other services, for example those requiring daily information about road traffic, as input specifications, it is preferable to set a pixel size which is as small as possible in addition to the maximum allowable error on mobility indexes.

A currently preferred embodiment of the invention deals with a road traffic monitoring system comprising: at least one first input for receiving position estimations of mobile terminals; at least one second input for receiving input specifications chosen depending on the type of service for which such monitoring is performed; and at least one output for generating road traffic maps, each road traffic map being associated with a set of territory elements and including for each of said territory elements at least one mobility index of mobile terminals travelling within such territory element.

Another aspect of the present invention deals with a road traffic monitoring method comprising the following steps:

- receiving position estimations of mobile terminals;
- receiving input specifications chosen based on the type of service for which such monitoring is performed;
- generating road traffic maps, each road traffic map being associated with a set of territory elements and including for each of said territory elements at least one mobility index of mobile terminals travelling within such territory element.

Further preferred aspects of the present invention are described in the dependent claims and in the present description.

BRIEF DESCRIPTION OF THE ENCLOSED DRAWINGS

The invention will now be described, as a non-limiting example, with reference to the figures of the enclosed drawings, in which.

DETAILED DESCRIPTION OF EMBODIMENTS OF THE INVENTION

Figure 1:
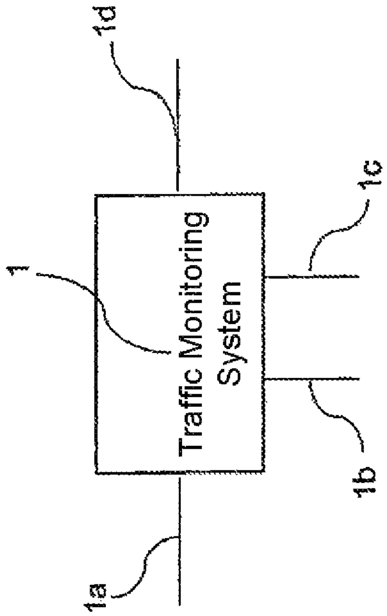
FIG. 1 shows the monitoring system according to the invention.

As shown in FIG. 1, the road traffic monitoring system 1 of the present invention comprises at least one first 1*a*, one second 1*b* and one third 1*c* input for respectively receiving position estimations of mobile terminals (herein below "position estimations"), input specifications and so-called characteristic data which will be better detailed below, and at least one output 1*d* for generating pixel-based road traffic maps. In particular, each road traffic map is associated with a set of pixels which cover a relevant geographic area, and contains, for each pixel belonging to the set, the mobility indexes values (for example the average speed) of mobile terminals/vehicles travelling within such pixel for a certain observation time slot of the pixel itself.

Position Estimations

Position estimations of mobile terminals can be based on information coming from a cellular communication system (for example of the GSM, EDGE, UMTS, PDC type) or from systems of the GPS, AGPS, Galileo or Assisted-Galileo type; in general, from systems which are able to provide position estimations which take into account that a subset of terminals is under mobility.

In particular, information coming from cellular communication systems are preferably those already present within the systems themselves and used for their normal operation, such as, for example, power measures on received signals, propagation delay time measures, identifications of serving cells and adjacent cells, etc. These information are then used by the positioning methods (such as, for example, CI, Enhanced CI, TDOA, EOTD) for obtaining position estimations.

Advantageously, the use of such information, already present in cellular systems, avoids to operate actively on these latter ones for requesting the generation of new information. In this way, an excessive overload of signalling and connections on systems themselves is avoided.

It is further appropriate to assume that used positioning methods are able to provide subsequent position estimations, namely available for every user in subsequent time slots (for example every five seconds) and to take into account that a subset of terminals able to be located is under mobility, namely on a vehicle, as will be better detailed herein below in the present description.

Input Specifications

Positioning methods, which can be used for position estimations, typically have two types of problems:

1) the number of mobile terminals which can be tracked is only a subset of all mobile terminals which can be found on a vehicle. In particular, as regards the positioning method based on information linked to the cellular communication system operation, it can be stated that:

- not all users being found on a vehicle have a turned-on mobile terminal;
- a mobile telephone Operator, in general, cannot have available locations of users belonging to other mobile telephone Operators;
- by using non-intrusive positioning methods, namely which use data available on signalling interfaces of the cellular communication system, it is possible to locate only those users which perform a call (connected users). These data, in fact, are not present in signalling interfaces for connection terminals only.
- Positioning methods based on GPS, AGPS, Galileo, Assisted-Galileo systems suffer, in addition to previously listed problems, also of those linked to the limited number of mobile terminals equipped with receivers which are able to exploit such systems and to the possible unavailability of such systems, above all in a hurban context.

2) position estimations obtained using the above described positioning methods are generally affected by errors. For example, position estimations of mobile terminals using information coming from cellular communication systems can contain estimation errors which can be on the order of 100 m or 200 m in high cell density areas (typically hurban areas) but can also reach several Km in low cell density areas (typically sub-hurban or extra-hurban areas). These position estimation errors can imply errors both in assigning mobile terminals to pixels, for example deducing that the mobile terminal is in a given pixel, while the terminal actually is in another pixel, presumably the adjacent one, and in vehicle speed estimations.

The Applicant has observed that this determines a condition for which, having set a pixel size and a pixel observation time slot width, the mobility indexes values computed by the monitoring system 1 are affected by errors. However, mobility indexes errors decrease when the number of observed terminals under mobility increases, in a certain pixel and for a certain observation time slot.

The Applicant has also observed that the number of observed terminals under mobility depends on pixel size (the greater the pixel size, the higher the number of terminals travelling in such pixel) and on observation time slot size (the greater the observation time slot size, the higher the number of observed terminals). This implies that, after having set the number of observed terminals which makes the mobility indexes estimation reliable, there is a trade-off between pixel size and pixel observation time slot size.

According to the present invention, the monitoring system 1 is able to manage this trade-off, making the mobility indexes estimation more accurate, using as input specifications at least two parameters chosen among: pixel size, observation time slot length and maximum allowable error on mobility indexes estimation. After having set at least two among the above listed parameters, for example observation time slot and maximum allowable error on mobility indexes, the monitoring system according to the invention is able to determine the other parameter, in this case the pixel size, depending on pre-computed relationships or on mathematical models which allow describing the link existing between input specifications and parameter to be computed, also taking into account other parameters, the so-called characteristic data including for example: density of user calls within each pixel (herein below defined as "calls density") and error in used positioning method.

It is however useful to state that, as regards calls density, for example per square kilometer, being this latter one a parameter which depends on the number of talking users in the affected pixel and on their distribution on the pixel itself, it is rather complex to operate on it. In fact, the calls density distribution is generally different from pixel to pixel and changes in time. In order to make the choice of this parameter as characteristic data easier, therefore, it can be assumed to collect for every pixel being observed some statistical data about calls distribution in order to have a knowledge of this parameter beforehand. Alternatively, this parameter can be computed "run time" depending on the actual number of calls performed by users having been traveled in pixels being observed.

The Applicant has further noted that the presence of input specifications which take into account at least two among the parameters chosen among pixel size, observation time slot size, and maximum allowable error on mobility indexes estimation allows better adapting the monitoring system 1 to the service which uses it.

In particular, there are some services, for example those providing for the traffic display on maps with a set resolution, which require as input specifications to set pixel size and maximum allowable error on mobility indexes estimation. For other services, for example those requiring strictly "real time" information, as input specifications the following can be set: observation time slot size and maximum allowable error on mobility indexes estimation. In still other services, for example those which require traffic information on a daily basis, as input specifications the following can be provided: a pixel size which is as small as possible, as better described herein below in the present description, in addition to maximum allowable error on mobility indexes estimation.

Mobility Indexes Maps

The monitoring system 1 provides for the generation on output 1*d*, for every pixel, of a road traffic map containing the values of a set of mobility indexes related to a certain observation time slot of the pixel itself.

Herein below in the present description, the term pixel will mean a territory element, typically of a rectangular, or more particularly square, shape, having varying sizes.

According to the present invention, the monitoring system 1 associates each pixel with one or more mobility indexes indicating the mobility status of users and therefore of mobile terminals which can be found within the pixel itself. For example, the following can be used as mobility indexes:

- the value of average travelling speed of vehicles travelling in the pixel under observation in a certain pixel observation time slot; this average is meant as speed modulus;
- the average speed value of vehicles travelling in the pixel under observation in a certain pixel observation time slot decomposed in its four major components (North, East, South, West), as will be better described in the description which follows;
- the number of users under mobility travelling in the pixel under observation in the considered observation time slot;
- the number of trajectories traveled by users within the pixel under observation in the considered observation time slot; and
- the number of occurrences, namely the number of locations estimated by the used positioning method, for users under mobility within the pixel under observation and in the considered observation time slot.

It must be noted that all mobility indexes refer to a given pixel having a certain size, and to a certain pixel observation time slot.

The monitoring system 1 is then able to generate as output one or more vehicle traffic maps in the form of matrixes, one matrix for every mobility index.

Figure 6:
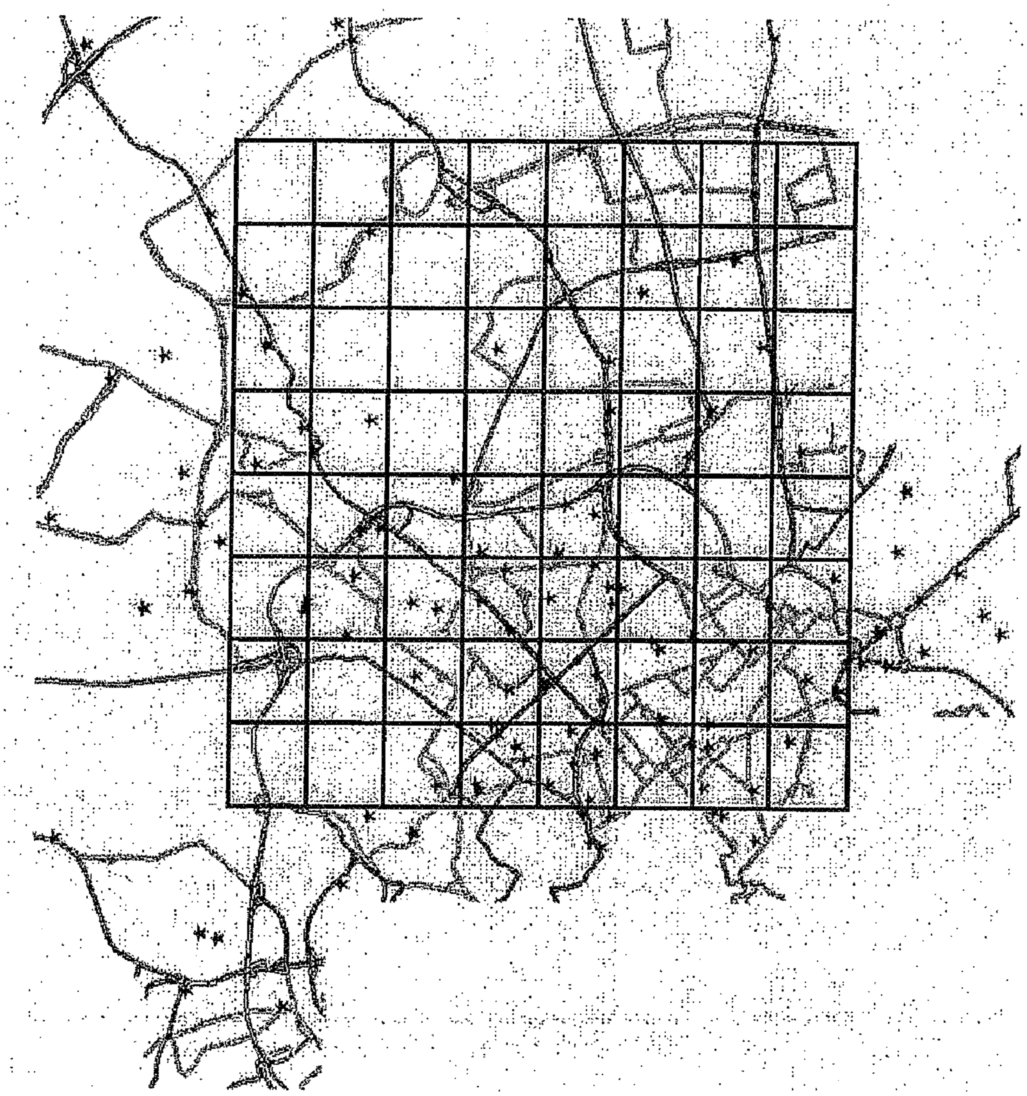
FIG. 6 shows a vehicle traffic map associated with a set of pixels generated by the monitoring system according to the invention.

For example, FIG. 6 shows a vehicle traffic map associated with a set of pixels belonging to a certain geographic area. These pixels, according to the invention, are associated with values of one or more mobility indexes.

Mobility Indexes Computation Mode

Figure 2:
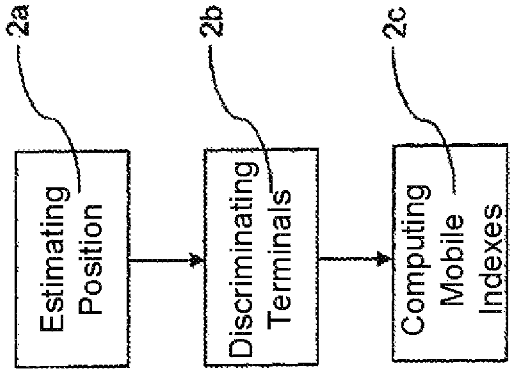
FIG. 2 shows a flow diagram related to a method implemented by the monitoring system according to the invention.

For computing the previously described mobility indexes, the monitoring system 1 uses the below listed steps shown in FIG. 2:

step 1) using (block 2*a* of FIG. 2) position estimations received in input 1*a* as input parameter for tracking algorithms which are able to determine the trajectory followed by each mobile terminal and its movement speed;

step 2) discriminating (block 2*b* of FIG. 2) among mobile terminals belonging to users moving on vehicles and mobile terminals belonging to users not moving on vehicles (for example pedestrians); and step 3) computing (block 2*c* of FIG. 2) mobility indexes for every pixel under observation.

Specifically, position estimations used by the monitoring system 1 in step 1 require that the mobile terminal is located periodically, namely for a minimum period of time (for example 5 sec) necessary for tracking algorithms for determining terminal speed and trajectory. As already previously mentioned, the location can be performed by using for example the methods which require, from the mobile terminal or from the cellular communication system serving the mobile terminal, all necessary information for determining the position of the mobile terminal itself (for example previously listed positioning methods). Alternatively, information can be used which are travelling in signalling links of the cellular communication system when the mobile terminal is communicating. For example, for the normal management of a GSM mobile terminal mobility communicating on Abis signalling links (namely the signalling interface which allows two nodes of the GSM system, for example BTS and BSC, to mutually talk) with a period of 0.480 seconds, time and power measures on the serving cell together with power measures performed on a maximum of six adjacent cells from the GSM mobile terminal are travelling. These information allow locating the terminal with a 0.480 second periodicity. In order to reduce positioning apparatus processing loads, it is possible to increase the period of time between two following locations, performing a decimation of collected measures, namely taking for example one measure every 10 among the available measures and discarding the other ones, it is possible to obtain an estimated position every 4.8 seconds. Computed locations for the same mobile terminal, in following periods of time, are processed by the monitoring system 1 through tracking algorithms, for determining mobile terminal trajectory and movement speed. As already previously mentioned, estimated mobile terminal positions are affected by errors, in particular the positioning method does not locate a spot, but an uncertainty area in which the mobile terminal can be found. The use of tracking algorithms allows, by using many following mobile terminal positions, to more accurately estimate the trajectory followed by the mobile terminal and at the same time to determine its speed. Speed can be determined as average speed on the whole route followed by the mobile terminal, as average speed within limited sections of the route followed by the mobile terminal (for example the section within the pixel under observation), or as estimated speed in every new position assumed by the mobile terminal along its route. Tracking algorithms allow suitably filtering the position estimations obtained in input 1*a* through one of the filtering techniques known in literature, for example low-pass filtering or filtering with a Kalman filter (this latter one described for example in Brown, R. G., Hwang, P. Y. C., Introduction to Random Signals and Applied Kalman Filtering, 3rd ed., John Wiley & Sons, Inc., 1997).

In step 2, the monitoring system 1 discriminates among mobile terminals which will be pointed out as pedestrians and those which will be pointed out as vehicles. In particular, during the present description, the term pedestrians means the mobile terminals belonging to users who are moving on foot or are unmoving, while the term vehicles means the mobile terminals belonging to users which are in moving vehicles. The distinction between pedestrians and vehicles is performed by implementing algorithms which use as main information the mobile terminal speed. For example, a mobile terminal can be considered as a vehicle if its speed computed on the whole terminal observation route exceeds the maximum speed established beforehand for a pedestrian. An alternative for designating the mobile terminal as vehicle is verifying whether the terminal instantaneous speed is kept above a certain threshold for a pre-established percentage of time on the necessary time for travelling along the traced route or the portion of traced route.

In step 3 the monitoring system 1 computes the previously described mobility indexes. The monitoring system 1 computes the mobility indexes by taking into account only those trajectories assigned to terminals under mobility.

The computation of each mobility index is performed by block 2*c* of the traffic monitoring system 1 and occurs as described below:

- the average speed value within the pixel under observation is determined by performing the average of absolute values of estimated speeds within the pixel itself in the considered observation time slot;
- the average speed value in the four major components is determined by assuming a mobile terminal movement on a horizontal plane, where average values are computed, for example along North, South, East and West directions, of estimated speeds, within the pixel under observation and in the considered observation time slot, decomposed with respect to the mentioned directions. If the mobile terminal movement is taken into account in the three-dimensional space, average speed components along the vertical direction will also be taken into account;

the number of users under mobility is determined by the number of users under mobility measured within the pixel under observation in the considered observation time slot;

the number of trajectories of users within the pixel under observation is determined by the number of trajectories measured within the pixel itself in the considered observation time slot. This value is different from the number of users under mobility since, theoretically, the same user can perform many trajectories within the pixel under observation in the considered observation time slot; and the number of occurrences is determined by computing the number of locations estimated by the positioning method used for users under mobility within the pixel under observation and in the considered observation time slot.

Input Specifications Managing Mode

As previously mentioned, the mobility indexes, estimated by the monitoring system 1 with reference to the pixel under observation, are affected by errors: for example errors in assigning terminals to pixels and/or errors in estimating terminal speeds.

Advantageously, the Applicant has noted that it is possible, once knowing the used positioning method, to create mathematical models which allow describing the link existing between input specifications: pixel size, observation time slot length and maximum allowable error in mobility indexes estimation and the so-called characteristic data, such as, for example, calls density and used positioning method error, and to use these mathematical models to make the mobility indexes estimation more accurate.

Figure 3:
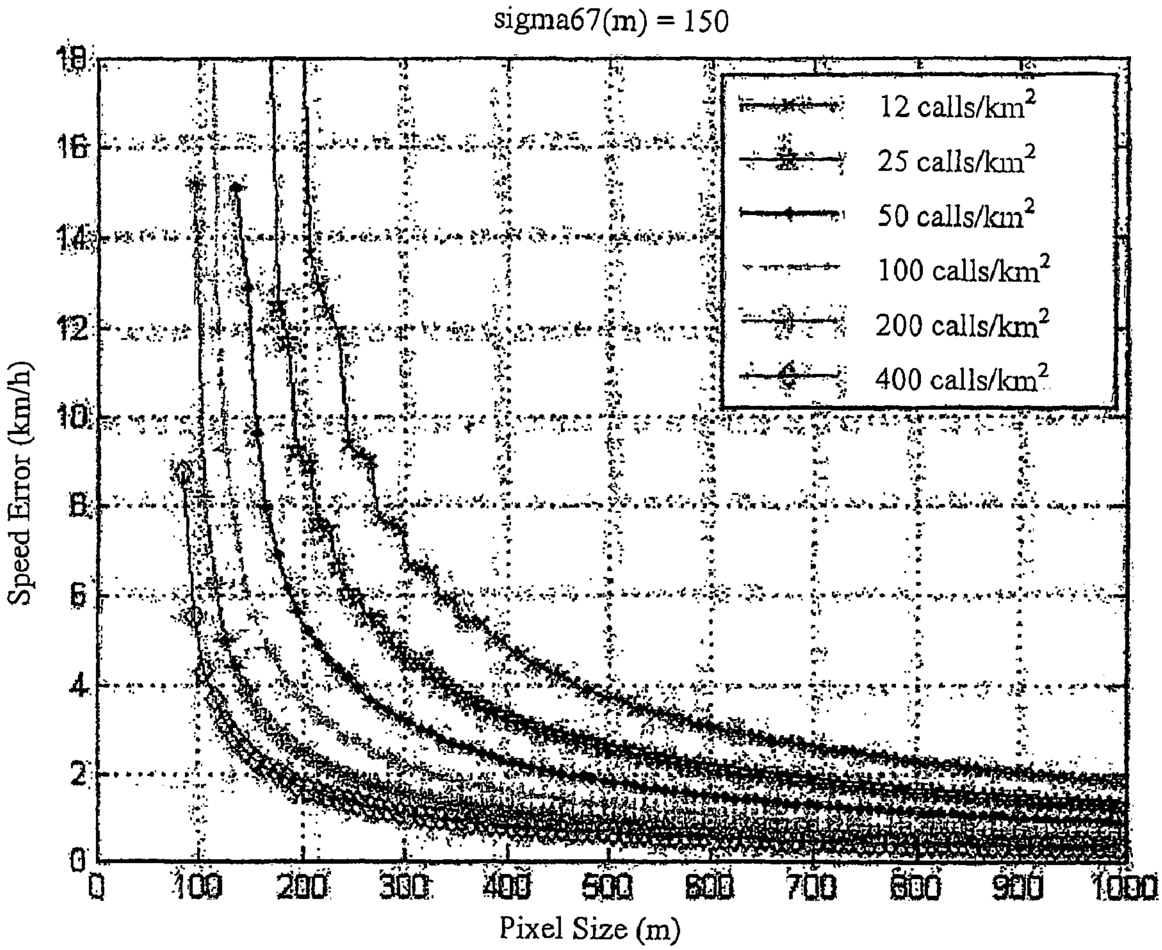
FIGS. 3, 4 and 5 show possible behaviours of quantities used by the monitoring system according to the invention.

As an example, FIG. 3 shows, after having set the observation time slot, the relationship existing between mobility index error, indicating the speed obtained as average of absolute values of estimated speeds within the pixel under observation and pixel size. The relationship is given by parameters depending on calls density, for example per square kilometer, and supposing to have a positioning method with a 150-meter accuracy in 67% of the cases (this can be obtained by using for example the Enhanced CI positioning method). It is observed that, after having set a certain calls density, the mobility index error indicating the estimated speed decreases when the pixel size increases. It is further observed that, with the other parameters identical, namely pixel size and positioning method accuracy, the error decreases when the calls density per square kilometer increases, this because the number of available measure samples for realising the estimation increases.

Figure 4:
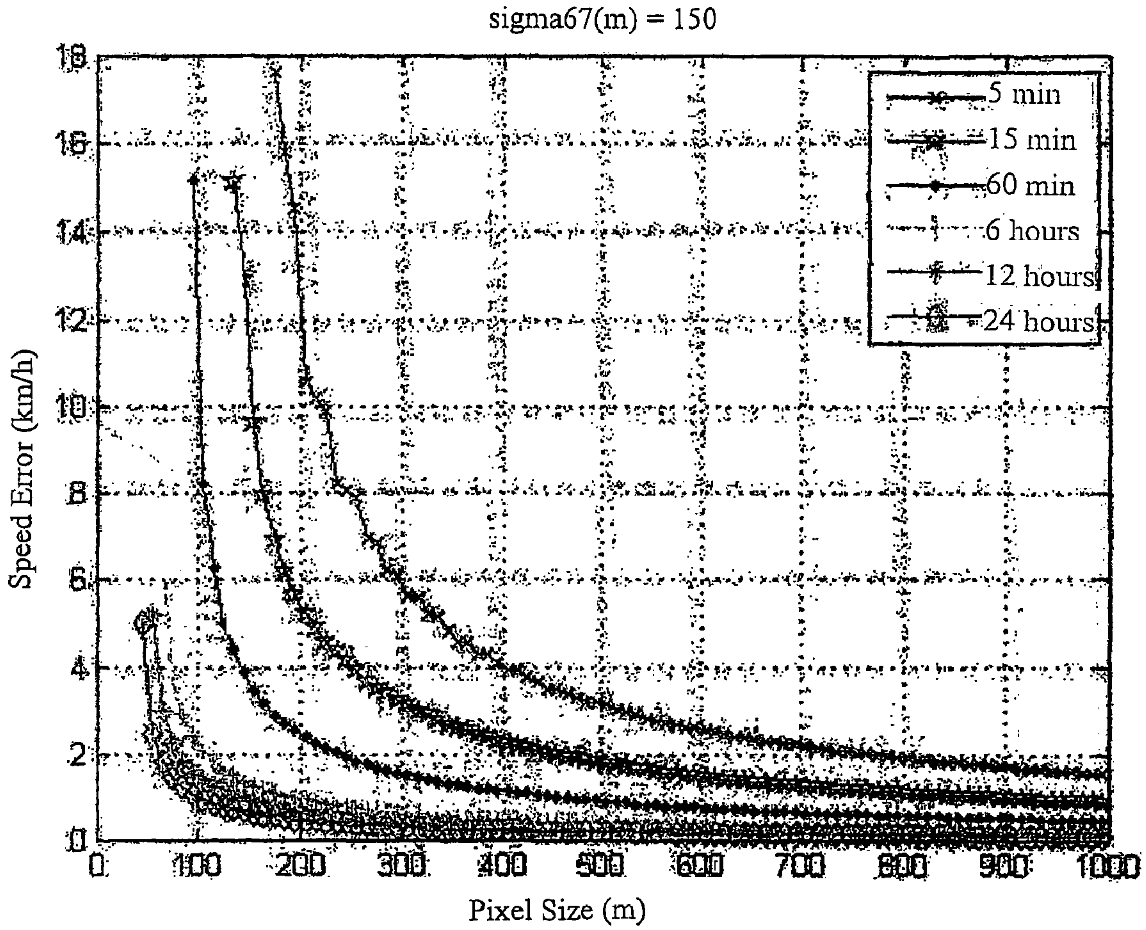
Figure 5:
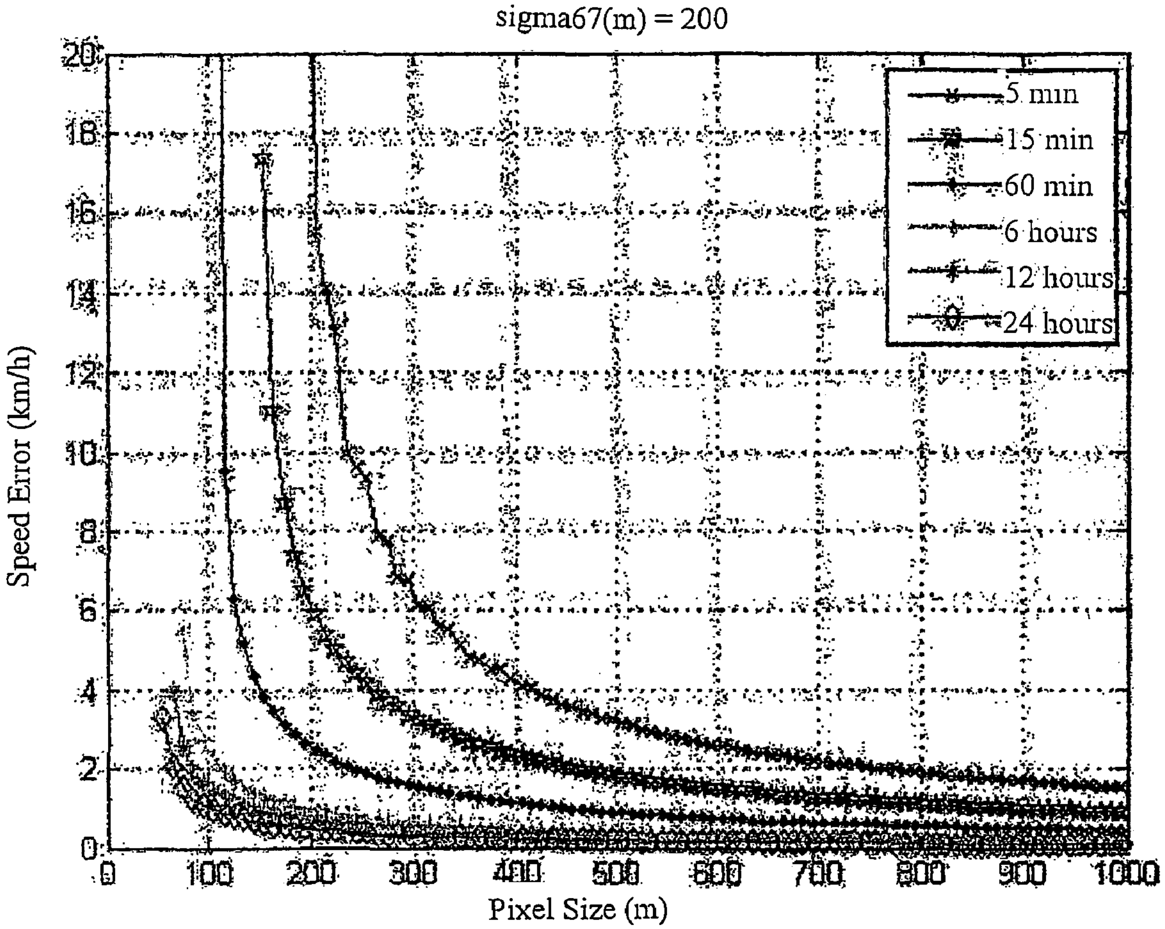

FIGS. 4 and 5 show, after having set the average calls density per square kilometer at 40 calls per square kilometer, the behaviour of error on speed obtained as average of absolute values of estimated speeds when the size of the pixel under observation changes, with the parameter of the observation time slot length. In particular, FIG. 4 shows the relationship between error on estimated speed and size of pixel under observation for a positioning method with a 150-meter accuracy in 67% of the cases, while FIG. 5 shows the relationship between error on estimated speed and size of pixel under observation for a positioning method with a 200-meter accuracy in 67% of the cases (this can be obtained by using for example the Enhanced CI positioning method). It is observed that, when the size of the pixel under observation increases, with the other parameters identical, the error of estimated pixel speed decreases. The error, moreover, decreases when the observation time slot increases. By comparing FIGS. 4 and 5, it is observed that the error on estimated speed in the pixel under observation increases when the positioning method error increases.

Herein below, some examples of input specifications managing when the service for which a road traffic estimation is required, are described. For example:

a) the service can require a suitable pixel size and a certain maximum allowable error on mobility indexes, but can not have constraints on the observation time slot length. A service of this type can for example be the one offered to municipalities which use statistic traffic distribution for hurban planning purposes, for example for planning road interventions, parkings, etc., or for dimensioning public transports. In this case, the following are given as input specifications to the monitoring system 1: pixel size and maximum allowable error, namely the desired accuracy, on considered mobility indexes, while the used positioning method accuracy is provided as characteristic data. By knowing these parameters, the monitoring system 1 is able to determine (through the previously described mathematical models) such a value of the calls density parameter as to obtain the desired accuracy on considered mobility indexes. Once having computed such value, the monitoring system 1 will supply the road traffic map with the various mobility indexes having the desired accuracy after such an observation time slot that, in all pixels of the relevant area, there will be a number of calls (calls density) greater than or equal to the computed value. Alternatively, the calls density parameter can be computed "run-time" by counting the calls performed by users till the desired accuracy is reached on mobility indexes;

b) the service can require that traffic information are updated with a certain timing (for example every 15 minutes) and with a set threshold for the maximum allowable error on mobility indexes estimation. A service of this type can for example be a service aimed for drivers which are interested in having updated traffic information in order to be able to choose the quickest route. In this case, the following are used as input specifications: observation time slot length and set threshold for maximum allowable error on mobility indexes, while used positioning method accuracy is provided as characteristic data. Pixel sizes can be computed by using for example two alternatives: the first alternative is setting the same size for all pixels. In this case, the only unspecified parameter is the pixel calls density parameter, which however cannot be modified by the monitoring system 1. The monitoring system 1 will therefore limit itself to compute the relevant mobility indexes only for those pixels for which the calls density parameter is such as to allow a maximum allowable error on mobility indexes estimation within the previously set threshold. The second alternative is providing a vehicle traffic map with its pixel size which changes depending on calls density in different portions of the relevant area. In this case, the monitoring system 1 can operate on pixel size. In particular, the monitoring system 1 can divide the relevant area into pixels with different size depending on calls density: thereby, there will be bigger pixels where the calls density is lower, in order to have, in the pixel, the minimum number of calls adapted to satisfy the constraint on the maximum allowable error for mobility indexes;

c) another mode for supplying input specifications to the monitoring system 1 is, after having set the maximum allowable error on mobility indexes, providing suitable value ranges for pixel size and for observation time slot length, depending on the type of required service. For example, for an information type service for drivers, the following input specifications could be provided:

10 minutes≦observation_time≦30 minutes 50 meters_side≦pixel_size≦300 meters_side In this case, the monitoring system 1 will verify that there are pairs (pixel sizes, observation time slot length) which comply with specifications on maximum allowable error on considered mobility indexes and the service supplier will be given the chance of choosing, for example making him set a priority on one of the two parameters. For example, if a higher priority has been assigned to the observation time slot, a pixel size and observation time slot length pair will be chosen in order to make this latter parameter maximum.

The invention claimed is:

1. A road traffic monitoring system comprising:

at least one first input for receiving position estimations of mobile terminals;

at least one second input for receiving input specifications, selected depending on the type of service for which such monitoring is performed; and at least one output for generating road traffic maps, each road traffic map comprising a plurality of equally sized territory elements, wherein each one of the plurality of equally sized territory elements comprise at least one mobility index of mobile terminals travelling within the plurality of equally sized territory elements.

2. The system according to claim 1 wherein said input specifications are selected from at least two of the following parameters: territory element size, territory element observation time slot, and maximum allowable error on the estimation of said at least one mobility index.

3. The system according to claim 2, wherein said input specifications are two of the following parameters: territory element size, territory element observation time slot, and maximum allowable error on the estimation of said at least one mobility index.

4. The system according to claim 1, comprising at least one third input for receiving characteristic data, said characteristic data being selected from at least one of the following parameters: density of calls performed by users within each one of the plurality of equally sized territory elements, and accuracy of said position estimations.

5. The system according to claim 1, wherein said position estimations are based on information coming from a cellular communication system.

6. The system according to claim 1, wherein said position estimations are based on information coming from a satellite communication system.

7. The system according to claim 1, wherein for each one of the plurality of equally sized territory elements, said at least one mobility index is selected from at least one of the following parameters: average travelling speed value of mobile terminals travelling in the territory element; number of users under mobility travelling within the territory element; number of trajectories travelled by mobile terminals within the territory element; and number of estimated positions for mobile terminals within the territory element.

8. A road traffic monitoring method comprising the following steps:

receiving position estimations of mobile terminals;

receiving input specifications selected depending on the type or service for which such monitoring is performed; and generating road traffic maps, each road traffic map being comprising a plurality of equally sized territory elements, wherein each one of the plurality of equally sized territory elements comprise at least one mobility index of mobile terminals travelling within the territory element.

9. The method according to claim 8, wherein input specifications are selected from at least two of the following parameters: territory element size, territory element observation time slot, and maximum allowable error on the estimation of said at least one mobility index.

10. The method according to claim 9, wherein said input specifications are selected from two of the following parameters: territory element size, territory element observation time slot, and maximum allowable error on the estimation of said at least one mobility index.

11. A road traffic monitoring system comprising:

at least one first input for receiving position estimations of mobile terminals;

at least one second input for receiving input specifications, selected from at least two of the following parameters: territory element size, territory element observation time slot, and maximum allowable error on the estimation of said at least one mobility index; and at least one output for generating road traffic maps, each road traffic map comprising a plurality of territory elements, wherein each one of the plurality of territory elements comprise at least one mobility index of mobile terminals travelling within the plurality of territory elements.

* * * * *